United States Patent
Tian et al.

(10) Patent No.: US 12,002,269 B2
(45) Date of Patent: Jun. 4, 2024

(54) VEHICLE FEATURE ACQUISITION METHOD AND DEVICE

(71) Applicant: NEUSOFT REACH AUTOMOTIVE TECHNOLOGY (SHENYANG) COMPANY, Shenfu New District (CN)

(72) Inventors: Huan Tian, Shenfu New District (CN); Jun Hu, Shenfu New District (CN); Shuai Cheng, Shenfu New District (CN)

(73) Assignee: NEUSOFT REACH AUTOMOTIVE TECHNOLOGY (SHENYANG) COMPANY, Shenfu New District (CN)

( * ) Notice: Subject to any disclaimer, the term of this patent is extended or adjusted under 35 U.S.C. 154(b) by 534 days.

(21) Appl. No.: 17/280,191

(22) PCT Filed: Apr. 26, 2019

(86) PCT No.: PCT/CN2019/084537
§ 371 (c)(1),
(2) Date: Mar. 26, 2021

(87) PCT Pub. No.: WO2020/062856
PCT Pub. Date: Apr. 2, 2020

(65) Prior Publication Data
US 2022/0004784 A1    Jan. 6, 2022

(30) Foreign Application Priority Data
Sep. 27, 2018  (CN) .......................... 201811132325.X (51) Int. Cl.
*G06V 20/58*    (2022.01)
*G06T 7/73*     (2017.01)
(Continued)

(52) U.S. Cl.
CPC ............... *G06V 20/58* (2022.01); *G06T 7/73* (2017.01); *G06V 10/764* (2022.01);
(Continued)

(58) Field of Classification Search
CPC .... G06V 20/58; G06V 10/764; G06V 10/422; G06V 10/82; G06V 20/584; G06V 2201/08; G06T 7/73; G06T 2207/30252
See application file for complete search history.

(56) References Cited

U.S. PATENT DOCUMENTS 10,176,405 B1 *  1/2019  Zhou ...................... G06T 7/246
2016/0375904 A1  12/2016  Satzoda et al.
(Continued)

FOREIGN PATENT DOCUMENTS

CN    104021379 A    9/2014
CN    106023220 A    10/2016
(Continued)

OTHER PUBLICATIONS

European Patent Office, Extended European Search Report Issued in Application No. 19864666.3, May 31, 2022, Germany, 15 pages.
(Continued)

*Primary Examiner* — Jianxun Yang
(74) *Attorney, Agent, or Firm* — Kilpatrick Townsend & Stockton LLP (57) ABSTRACT

A method and a device for acquiring a vehicle feature are provided. In the method, a to-be-processed image including a vehicle is acquired. A feature element of the vehicle is then recognized from the to-be-processed image, where the feature element may be a side element and an element of a vehicle end, and the vehicle-end may be a head of the vehicle or a rear of the vehicle. Based on a position of the side element in the to-be-processed image and a position of the element of the vehicle end in the to-be-processed image,
(Continued)

a side region of the vehicle and an end region of the vehicle are determined.

16 Claims, 5 Drawing Sheets

(51) Int. Cl.
  *G06V 10/422* (2022.01)
  *G06V 10/764* (2022.01)
  *G06V 10/82* (2022.01)
(52) U.S. Cl.
  CPC .. *G06T 2207/30252* (2013.01); *G06V 10/422* (2022.01); *G06V 10/82* (2022.01); *G06V 20/584* (2022.01); *G06V 2201/08* (2022.01)

(56) References Cited

U.S. PATENT DOCUMENTS

2020/0020117 A1* 1/2020 Daehler ............... G06N 3/045
2020/0026936 A1   1/2020 Liu et al.

FOREIGN PATENT DOCUMENTS

| CN | 107256633 | A | 10/2017 |
| CN | 108241822 | A | 7/2018 |
| CN | 108388871 | A | 8/2018 |
| CN | 108491782 | A | 9/2018 |
| CN | 108509907 | A | 9/2018 |
| CN | 109389064 | A | 2/2019 |
| JP | 2018055597 | A | 4/2018 |
| KR | 20180061695 | A | 6/2018 |

OTHER PUBLICATIONS

Sivaraman Sayanan et al: "Vehicle Detection by Independent Parts for Urban Driver Assistance", IEEE Transactions on Intelligent Transportation Systems, IEEE, Piscataway, NJ, USA, vol. 14, No. 4, Dec. 1, 2013, pp. 1597-1608.

Sayanan Sivaraman et al: "Real-time vehicle detection using parts at intersections", Intelligent Transportation Systems (ITSC), 2012 15th International IEEE Conference on, IEEE, Sep. 16, 2012, pp. 1519-1524.

Rezaei Mahdi et al: "Robust Vehicle Detection and Distance Estimation Under Challenging Lighting Conditions", IEEE Transactions on Intelligent Transportation Systems, IEEE, Piscataway, NJ, USA, vol. 16, No. 5, Oct. 1, 2015, pp. 2723-2743.

Wen-Chung Chang et al: "Real-time side vehicle tracking using parts-based boosting", 2008 IEEE International Conference on Systems, Man and Cybernetics, IEEE, Piscataway, NJ, US, Oct. 12, 2008, pp. 3370-3375.

Tian Bin et al: "Rear-View Vehicle Detection and Tracking by Combining Multiple Parts for Complex Urban Surveillance", IEEE Transactions on Intelligent Transportation Systems, IEEE, Piscataway, NJ, USA, vol. 15, No. 2, Apr. 1, 2014, pp. 597-606.

The 1st Office Action issued in Japanese Patent Application No. 2021-542238 on May 31, 2022.

Yuqi Wang, "Research and application of video detection in intelligent transpiration system", Chinese master's thesis full-text database information science and Technology, Phase Fifth, May 2015, 2019, pp. 38-53.

Jun-fang Song et al., "Target Detection Based on 3D Multi-Component Model and Inverse Projection Transformation", Springer Science+ Business Media, LLC, part of Springer Nature 2017, total 13 pages.

Shunyun Chen,"The Leading Vehicle Distance Measurement Based on Digital Image Processing", the Chinese master's thesis full-text database Information science and Technology, Phase III, Mar. 15, 2012, pp. 34-42.

Chengyin Liu et al., "The research of vehicle recognition method based on linear array CCD", Chinese master's thesis full-text database information science and Technology II, Phase ninth, Sep. 15, 2014, pp. 13-33.

* cited by examiner

ND DEVICE

The present application is the national phase of International Patent Application No. PCT/CN2019/084537, titled "VEHICLE FEATURE ACQUISITION METHOD AND DEVICE", filed on Apr. 26, 2019, which claims priority to Chinese Patent Application No. 201811132325.X, titled "METHOD AND DEVICE FOR ACQUIRING VEHICLE FEATURE" filed on Sep. 27, 2018 with the China National Intellectual Property Administration, both of which are incorporated herein by reference in their entireties.

FIELD

The present disclosure relates to the field of vehicle, and in particular to a method and a device for acquiring a vehicle feature.

BACKGROUND

In the conventional technology, a target image may be analyzed to obtain a target object in the target image, and a feature of the target object may be acquired for subsequent analysis. For example, the condition of a road may be determined based on the color, shape, size, location and other feathers of a target object on the road that are acquired by recognizing the target object in a target image of the road. The target object may be, for example, a vehicle, a building, or a pedestrian.

Generally, the target object in the target image is presented as a plane region. For example, the vehicle and the pedestrian in the target image may be presented as respective regions in rectangular frames. The size of a region may depend on the size of the target object and a shooing parameter of the target image. The color of pixels in the region may depend on the color of the target object.

However, in practical applications, it is usually not sufficient to determine only the plane region where the vehicle locates in the target image.

SUMMARY

In order to solve the above problems, a method and a device for acquiring a vehicle feature are provided according to embodiments of the present disclosure, by which regions in the vehicle in the to-be-processed image are obtained, and then region features are acquired from the obtained regions, so that a more comprehensive vehicle feature can be obtained.

The method for acquiring a vehicle feature provided according to an embodiment of the present disclosure includes: acquiring a to-be-processed image including a vehicle; recognizing a feature element of the vehicle from the to-be-processed image, the feature element including a side element and an element of a vehicle end, and the vehicle end including a head of the vehicle or a rear of the vehicle; determining a side region of the vehicle and an end region of the vehicle, based on a position of the side element in the to-be-processed image and a position of the element of the vehicle end in the to-be-processed image; and acquiring a side region feature based on the side region, and an end region feature based on the end region.

In an embodiment, the determining a side region of the vehicle and an end region of the vehicle, based on a position of the side element in the to-be-processed image and a position of the element of the vehicle end in the to-be-processed image, includes: determining, in the to-be-processed image, a vehicle region where the vehicle locates; determining a boundary between the side region and the end region, based on the position of the element that is of the vehicle end and is close to the side element in the to-be-processed image and the position of the side element that is close to the element of the vehicle end in the to-be-processed image; and determining, in the vehicle region, the side region and the end region, based on the boundary, the position of the side element in the to-be-processed image, and the position of the element of the vehicle end in the to-be-processed image.

In an embodiment, the method further includes: determining a relative position of the vehicle to an image capturing device, based on the end region feature, the side region feature and a shooting parameter of the to-be-processed image, the image capturing device being a device that photographs the vehicle to obtain the to-be-processed image.

In an embodiment, the determining a relative position of the vehicle to an image capturing device, based on the end region feature, the side region feature and the shooting parameter of the to-be-processed image, includes: determining, one of the end region and the side region, that faces toward the image capturing device as a target region; and determining the relative position of the vehicle to the image capturing device, based on a region feature of the target region and the shooting parameter of the to-be-processed image.

In an embodiment, the determining a relative position of the vehicle to an image capturing device, based on the end region feature, the side region feature and a shooting parameter of the to-be-processed image, includes: determining the relative position of the vehicle to the image capturing device, based on a boundary between the end region and the side region, and the shooting parameter of the to-be-processed image.

In an embodiment, the side region feature includes a position of a vertex of the side region in the to-be-processed image, a position of a center point of the side region in the to-be-processed image, or a position of a midpoint of an edge of the side region in the to-be-processed image; and the end region feature includes a position of a vertex of the end region in the to-be-processed image, a position of a center point of the end region in the to-be-processed image, or a position of a midpoint of an edge of the end region in the to-be-processed image.

In an embodiment, the recognizing a feature element of the vehicle from the to-be-processed image includes: recognizing the vehicle region where the vehicle locates in the to-be-processed image; clipping the vehicle region from the to-be-processed image to generate a vehicle image; and recognizing the feature element of the vehicle from the vehicle image.

In an embodiment, the element of the head of the vehicle includes one or more of a front light, a front window, a bumper and a front license plate, the element of the rear of the vehicle includes one or more of a rear light, a rear window, and a rear license plate, and the side element includes one or more of a wheel, a side window, a rearview mirror, and a door.

The device for acquiring a vehicle feature provided according to an embodiment of the present disclosure includes: an image acquisition device configured to acquire a to-be-processed image including a vehicle; an image recognition device configured to recognize a feature element of the vehicle from the to-be-processed image, the feature element including a side element and an element of a vehicle end, and the vehicle-end including a head of the vehicle or a rear of the vehicle; a region determination device, configured to determine a side region of the vehicle and an end region of the vehicle, based on a position of the side element in the to-be-processed image and a position of the element of the vehicle end in the to-be-processed image; and a feature acquisition device configured to acquire a side region feature based on the side region, and acquire an end region feature based on the end region.

In an embodiment, the region determination device includes: a vehicle region determination device configured to determine, in the to-be-processed image, a vehicle region where the vehicle locates; a boundary determination device configured to determine a boundary between the side region and the end region, based on the position of the element that is of the vehicle end and is close to the side element in the to-be-processed image and the position of the side element that is close to the element of the vehicle end in the to-be-processed image; and a region determination subdevice configured to determine, in the vehicle region, the side region and the end region, based on the boundary, the position of the side element in the to-be-processed image, and the position of the element of the vehicle end in the to-be-processed image.

In an embodiment, the device further includes: a relative position determination device, configured to determine a relative position of the vehicle to an image capturing device, based on the end region feature, the side region feature and the shooting parameter of the to-be-processed image, the image capturing device being a device that photographs the vehicle to obtain the to-be-processed image.

In an embodiment, the relative position determination device includes: a target region determination device configured to determine, one of the end region and the side region, that faces toward the image capturing device as a target region; and a relative position determination subdevice configured to determine the relative position of the vehicle to the image capturing device, based on a region feature of the target region and the shooting parameter of the to-be-processed image.

In an embodiment, the relative position determination device is configured to determine the relative position of the vehicle to the image capturing device, based on a boundary between the end region and the side region, and the shooting parameter of the to-be-processed image.

In an embodiment, the side region feature includes a position of a vertex of the side region in the to-be-processed image, a position of a center point of the side region in the to-be-processed image, or a position of a midpoint of an edge of the side region in the to-be-processed image; and the end region feature includes a position of a vertex of the end region in the to-be-processed image, a position of a center point of the end region in the to-be-processed image, or a position of a midpoint of an edge of the end region in the to-be-processed image.

In an embodiment, the image recognition device includes: a vehicle region recognition device configured to recognize the vehicle region where the vehicle locates in the to-be-processed image; a vehicle image acquisition device configured to clip the vehicle region from the to-be-processed image to generate a vehicle image; and a feature element recognition device configured to recognize the feature element of the vehicle from the vehicle image.

In an embodiment, the element of the head of the vehicle includes one or more of a front light, a front window, a bumper and a front license plate, the element of the rear of the vehicle includes one or more of a rear light, a rear window, and a rear license plate, and the side element includes one or more of a wheel, a side window, a rearview mirror, and a door.

According to the embodiments of the present disclosure, a to-be-processed image including a vehicle is acquired. A feature element of the vehicle is then recognized from the to-be-processed image, where the feature element may be a side element and an element of a vehicle end, and the vehicle-end may be a head of the vehicle or a rear of the vehicle. Based on a position of the side element in the to-be-processed image and a position of the element of the vehicle end in the to-be-processed image, a side region of the vehicle and an end region of the vehicle may be determined. As a result, a side region feature may be acquired based on the side region, and an end region feature may be acquired based on the end region. According to embodiments of the present disclosure, regions in the vehicle in the to-be-processed image are first obtained, and then region features are acquired from the obtained regions, which can obtain a more comprehensive vehicle feature, compared with the conventional technology of determining only a position of the vehicle in the to-be-processed image.

BRIEF DESCRIPTION OF THE DRAWINGS

In order to more clearly embodiments of the present disclosure, the drawings to be used in the embodiments are briefly described below. Apparently, the drawings in the following description show only some embodiments of the present disclosure, and other drawings may be obtained by those skilled in the art from the drawings.

DETAILED DESCRIPTION

It is realized that, in the conventional technology, a target image may be analyzed to obtain a target object in the target image, and a feature of the target object may be acquired for subsequent analysis. For example, the condition of a road may be determined based on the color, shape, size, location and other feathers of a target object on the road that are acquired by recognizing the target object in a target image of the road. The target object may be, for example, a vehicle, a building, or a pedestrian.

Figure 1:
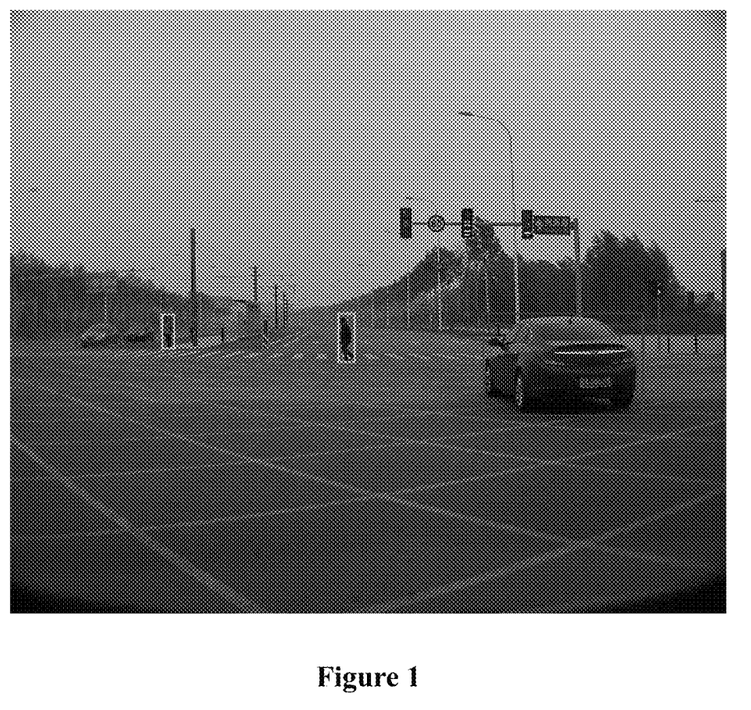
FIG. 1 is a schematic diagram of acquiring a feature from a target image according to the conventional technology.

Generally, the target object in the target image is presented as a plane region. Reference is made to FIG. 1, which is a schematic diagram of acquiring a feature from a target image according to the conventional technology. As shown in FIG. 1, the vehicle and the pedestrian in the target image are presented as respective regions in rectangular frames with different colors. Taking the vehicle as an example, the size of the vehicle region depends on the size of the vehicle and a shooing parameter for the vehicle. The color of pixels in the vehicle region depends on the color of the vehicle.

However, in practical applications, it is usually not sufficient to determine only the plane region where the vehicle locates in the target image. This is because, in practice, the vehicle has three-dimensional features, such as posture of the vehicle and a distance to an image capturing device, and the plane region may fail to reflect the three-dimensional features.

For example, when none of the front, rear, or side of the vehicle are right facing the image capturing device that photographs the vehicle to obtain a target image, it is usually inaccurate to calculate the distance from the vehicle to the image capturing device based on the plane region where the vehicle locates in the target image. Reference is made to FIG. 1, which is a schematic diagram of acquiring a feature through a target image according to the conventional technology. In the target image, the left rear of the vehicle presented in the lower left corner is closer to the image capturing device. If the distance from the vehicle to the image capturing device is calculated based on a center of the region where the vehicle locates in the image, then the calculated distance shall indicate the distance between the interior of the vehicle and the image capturing device. Therefore, the calculated distance is greater than the actual distance from the vehicle to the image capturing device. Such calculated result may lead to serious consequences if being used in a driving assistance system.

In view of this, according to an embodiment of the present disclosure, a to-be-processed image including a vehicle may be acquired. A feature element of the vehicle is then recognized from the to-be-processed image, where the feature element may include a side element and an element of a vehicle end, and the vehicle end may be a head of the vehicle or a rear of the vehicle. Based on a position of the side element in the to-be-processed image and a position of the element of the vehicle end in the to-be-processed image, a side region of the vehicle and an end region of the vehicle may be determined. As a result, a side region feature may be acquired based on the side region, and an end region feature may be acquired based on the end region. According to an embodiment of the present disclosure, regions in the vehicle in the to-be-processed image are first obtained, and then region features are acquired from the obtained regions, which can obtain a more comprehensive vehicle feature, compared with the conventional technology of determining only a position of the vehicle in the to-be-processed image.

Implementations of a method for acquiring a vehicle feature according to the embodiments of the present disclosure are described below in detail by way of example with reference to the drawings.

Figure 2:
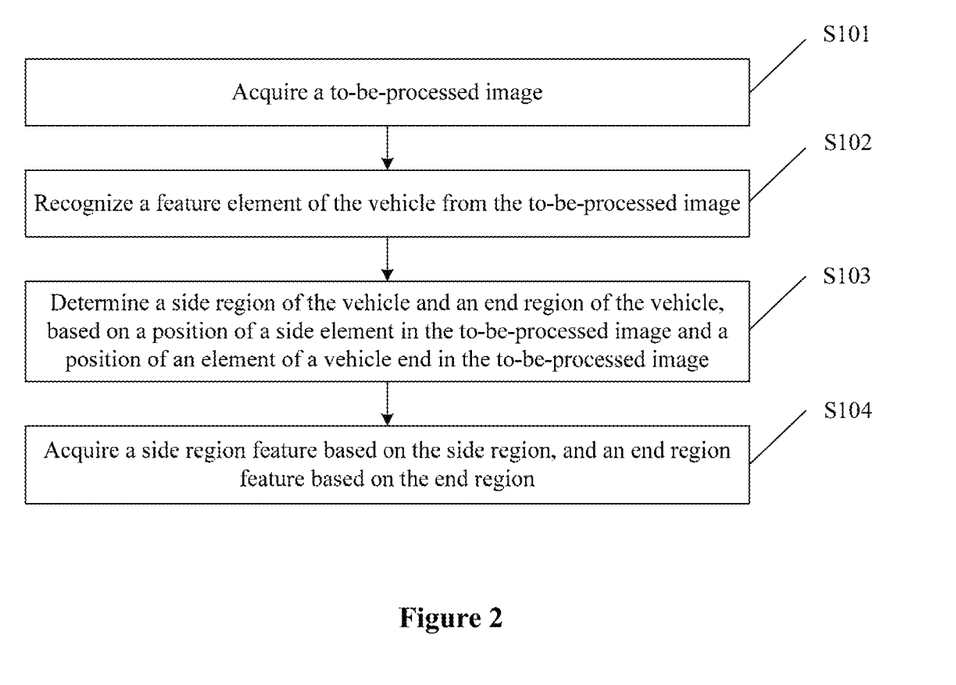
FIG. 2 is a flow chart of a method for acquiring a vehicle feature according to an embodiment of the present disclosure.

Reference is made to FIG. 2, which is a flow chart of a method for acquiring a vehicle feature according to an embodiment of the present disclosure. The method includes steps S101 to S104 as follows.

In step S101, a to-be-processed image is acquired.

According to an embodiment of the present disclosure, a target image is used as the to-be-processed image. The to-be-processed image includes a vehicle and may be captured by an image capturing device such as a camera, a camcorder and the like.

The to-be-processed image may include only the vehicle, or may further include a target object other than the vehicle. The to-be-processed image may include one or multiple vehicles.

In step S102, a feature element of the vehicle is recognized from the to-be-processed image.

According to the embodiment of the present disclosure, the feature element of the vehicle may include a side element and an element of a vehicle end. The vehicle end may be a head of the vehicle or a rear of the vehicle. The element of the head of the vehicle may include, for example, one or more of a front light, a front window, a bumper, a front license plate and any other element that may assist recognizing a position of the head of the vehicle. The element of the rear of the vehicle may include, for example, one or more of a rear light, a rear window, a rear license plate and any other element that may assist recognizing a position of the rear of the vehicle. The side element may include, for example, one or more of a wheel, a side window, a rearview mirror, a door and any other element that may assist recognizing a position of the side of the vehicle.

Specifically, the recognizing a feature element of the vehicle from the to-be-processed image may include dividing the to-be-processed image to obtain category labels of pixels in the to-be-processed image. In the divided to-be-processed image, the category labels of the pixels of a same feature element are the same. Therefore, the feature element of the vehicle is obtained based on the category labels. The division of the to-be-processed image may be realized by means of a pre-trained neutral network for deep learning. Specifically, a red elliptical region may be recognized as a light region, a large gray rectangular region may be recognized as a window region, and a circular region with white rays may be recognized as a wheel region, and so on.

In dividing the to-be-processed image, the divided image may be generated having different colors preset for different category labels, in order to facilitate process on the divided image. For example, the category label of the light region may correspond to a color of red, and the category label of the window region may correspond to a color of blue, and the like.

In a case where the to-be-processed image includes a target object other than the vehicle, in order to improve the accuracy of image division, the recognizing a feature element from the to-be-processed image may include: recognizing and clipping, from the to-be-processed image, a vehicle region where the vehicle locates, to generate a target image; and recognizing the feature element in the vehicle region from the target image.

Specifically, a first divided image may be obtained by performing recognition on the to-be-processed image using a pre-trained first neutral network for deep learning. Pixels in the first divided image have respective category labels, and the category labels of the pixels of a same target object are the same. Therefore, the vehicle region in the to-be-processed image may be recognized based on the category labels. A second divided image may be obtained by performing recognition on the target image using a pre-trained second neural network for deep learning. Pixels in the second divided image have respective category labels, and the category labels relating to a same feature element are the same. Therefore, the feature element in the vehicle region may be recognized based on the category labels.

Figure 3:
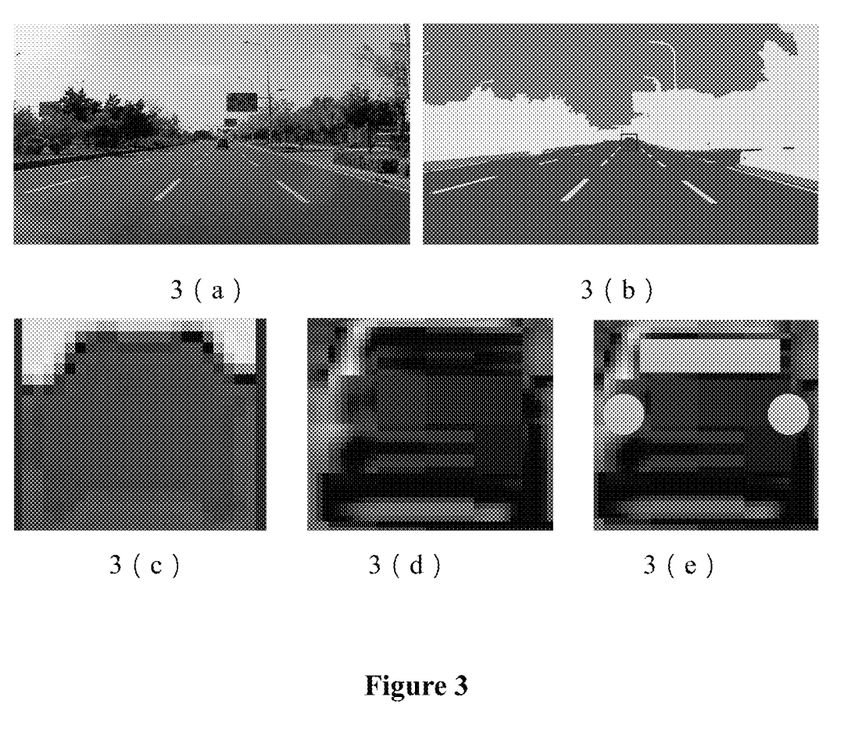
FIG. 3 is a schematic diagram of a process of recognizing a feature element according to an embodiment of the present disclosure.

As an example, reference is made to FIG. 3, which is a schematic diagram of a process of recognizing a feature element according to an embodiment of the present disclosure. Specifically, FIG. 3(a) is an exemplary to-be-processed image, which is divided through a first neutral network for deep learning to obtain a first divided image as shown in FIG. 3(b). In FIG. 3(b), the region within the rectangular frame indicates a vehicle region where the vehicle locates. By enlarging the rectangular frame in the first divided image, a vehicle division image is obtained as shown in FIG. 3(c). By clipping the to-be-processed image based on the vehicle division image, a vehicle image is obtained as shown in FIG. 3(d). By dividing the vehicle image through a second neutral network for deep learning, a second divided image is obtained as shown in FIG. 3(e), in which the two circular regions indicate lights on the vehicle, and the rectangular region indicates a window on the vehicle. Apparently, a wheel, a rearview mirror and any other element may be recognized in the embodiment of the present disclosure.

In step S103, a side region of the vehicle and an end region of the vehicle are determined based on the side element and the element of the vehicle end.

According to the embodiment of the present disclosure, the vehicle in the to-be-processed image includes at least a side element and an element of a vehicle end. A side region of the vehicle and an end region may be determined directly based on the side element and the element of the vehicle end.

For example, referring to the second divided image shown in FIG. 3(e), the element of the rear of the vehicle includes a rear light, a window and the like, the side element includes a wheel, a rearview mirror and the like. It may be determined that the wheel included in the side element is a rear wheel, thereby determining that the region of the rear of the vehicle in the to-be-processed image includes the rectangular region where the vehicle locates and the side region includes the left edge and the right edge of the region of the rear of the vehicle.

According to the embodiment of the present disclosure, before determining the side region and the end region of the vehicle, a vehicle region where the vehicle locates and a boundary between the side region and the end region may be determined. Then the side region and the end region may be determined in the vehicle region based on the boundary.

Figure 4:
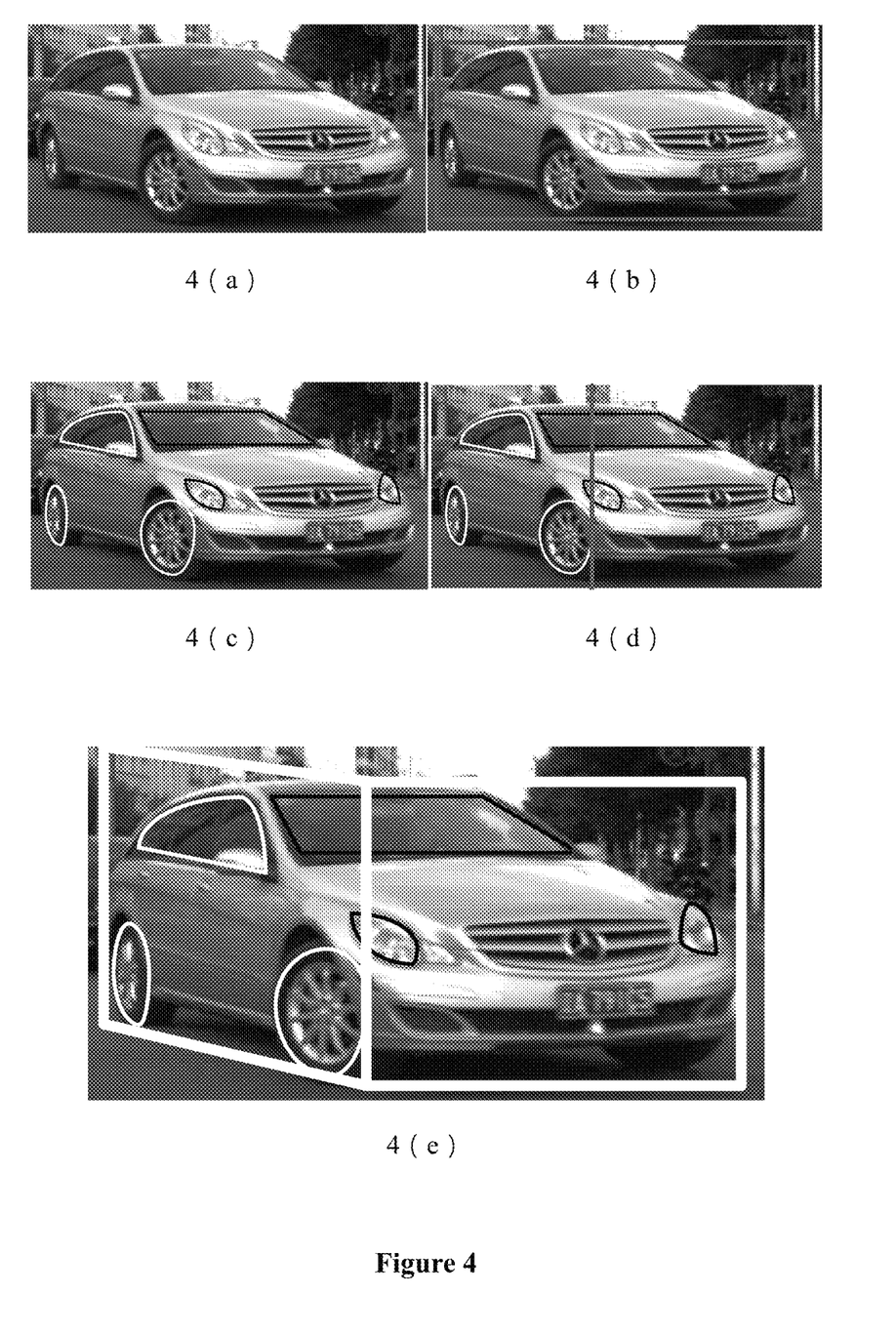
FIG. 4 is a schematic diagram of a process of determining a region according to an embodiment of the present disclosure.

Specifically, the boundary between the side region and the end region may be determined based on a position of the element that is of the vehicle end and is close to the side element in the to-be-processed image and a position of the side element that is close to the element of the vehicle end in the to-be-processed image. As an example, reference is made to FIG. 4, which is a schematic diagram of a process of determining a region according to an embodiment of the present disclosure. In FIG. 4, a to-be-processed image shown in FIG. 4(a) may be divided to obtain a vehicle region (the gray rectangular frame) shown in FIG. 4(b). FIG. 4(c) shows feature elements obtained by dividing the to-be-processed image, in which the two elliptical regions on the right (denoted by black lines) indicate lights on the vehicle, the quadrilateral region on the right (denoted by black lines) indicate a front window on the vehicle, the two elliptical regions on the left (denoted by white thin lines) indicate wheels of the vehicle, and the irregular shaped region (denoted by a white thin line) indicates a side window on the vehicle.

After analyzing, it may be determined that the vehicle end is the head of the vehicle, the side element close to an element of the head is the right wheel in the to-be-processed image and the right edge of the side window in the to-be-processed image, and the element that is of the head and is close to a side element, is the left edge of the front window and the left front light on the vehicle. Therefore, the boundary between the head region and the side region may be determined based on following elements in the to-be-processed image: the right wheel, the right edge of the side window, the left edge of the front window, and the left front light on the vehicle.

Apparently, the boundary between the head region and the side region may be determined through various methods. For example, the boundary may be determined based on the left edge of the front window and the right edge of the side window, or based on the right edge of the right wheel and the left edge of the left light. The boundary may be a vertical line or an oblique line. According to the embodiment of the present disclosure, as an example, a vertical straight line at the right edge of the right wheel may be determined as the boundary between the head region and the side region, as shown by the gray line in FIG. 4(d).

After determining the boundary between the side region and the end region, the side region and the end region may be determined in the vehicle region based on the determined boundary, the position of the side element in the to-be-processed image and the position of the element of the vehicle end in the to-be-processed image. It is to be understood that the side region and the end region are located respectively on two sides of the boundary. The side region or the end region may be a rectangular region, a parallelogram region, or a region in other shape.

Similarly, the side region and the end region may be determined in the vehicle region through various methods. For example, taking the vertical straight line at the right edge of the right wheel as the boundary between the head region and the side region, as shown in FIG. 4(e), a horizontal line passing through the contact points between the wheels and the ground may be determined as a lower edge of the head region, the boundary may be determined as a left edge of the head region, a horizontal line passing through the top of the vehicle may be determined as an upper edge of the head region, and the right edge of the vehicle region may be determined as a right edge of the head region. Therefore, the four edges forms the head region (the rectangle frame denoted by white bold lines on the right). In a similar way, the side region may be defined by four edges as follows (the parallelogram frame denoted by white bold lines on the left). The boundary may be determined as a right edge of the side region. The left edge of the vehicle region may be determined as a left edge of the side region. The direction of a line connecting the two contact points between wheels and the ground may be determined as the direction of an upper edge and a lower edge of the side region, where the right end of the upper edge coincides with the upper left vertex of the head region (that is, the intersection point of the horizontal line passing through the top of the vehicle and the boundary), and the right end of the lower edge coincides with the lower left vertex of the head region (that is, the contact point between the wheel and the ground).

In order to facilitate data storage, the side region and the end region may be represented by coordinates of six vertices in the to-be-processed image. Since the side region and the end region may be determined through various methods, as the boundary may be determined through various methods, multiple sets of the vertex coordinate values may be obtained. A weighted average of the multiple sets of vertex coordinate values may be obtained to indicate the side region and the end region with improved accuracy.

In step S104, a side region feature is acquired based on the side region, and an end region feature is acquired based on the end region.

According to the embodiment of the present disclosure, the side region feature may include a position of a vertex of the side region, a center point of the side region, a midpoint of an edge of the side region or another feature point of the side region in the to-be-processed image. The end region feature may include a position of a vertex of the end region, a center point of the end region, a midpoint of an edge of the end region or another feature point of the end region in the to-be-processed image. For example, the head region feature may include a position of a vertex of the head region in the to-be-processed image, a position of a center point of the head region in the to-be-processed image, a position of a midpoint of an edge of the head region in the to-be-processed image, or a position of another feature point of the head region in the to-be-processed image. It is to be understood that the position of the feature point in the to-be-processed image may be represented by a coordinate of the feature point in the to-be-processed image.

After obtaining the side region feature and the end region feature, a three-dimensional feature region of the vehicle may be obtained based on the vertices of both the side region and the end region. The three-dimensional feature region of the vehicle may include the head region, the rear region, the side regions at both sides, an upper region, and a lower region.

In the method for acquiring a vehicle feature provided according to the embodiment of the present disclosure, a to-be-processed image including a vehicle is acquired. A feature element of the vehicle is then recognized from the to-be-processed image, where the feature element may include a side element and an element of a vehicle end, and the vehicle end may be a head of the vehicle or a rear of the vehicle. Based on a position of the side element in the to-be-processed image and a position of the element of the vehicle end in the to-be-processed image, a side region of the vehicle and an end region of the vehicle may be determined. As a result, a side region feature may be acquired based on the side region, and an end region feature may be acquired based on the end region. Therefore, regions in the vehicle in the to-be-processed image are first obtained, and then region features are acquired from the obtained regions, which can obtain a more comprehensive vehicle feature, compared with the conventional technology of determining only a position of the vehicle in the to-be-processed image.

In practice, a vehicle feature is acquired for analysis, to obtain a result. As an example, according the embodiment of the present disclosure, after acquiring the end region feature and the side region feature, a relative position of the vehicle to the image capturing device may be determined based on the end region feature, the side region feature and a shooting parameter of the to-be-processed image.

The image capturing device is a device that photographs the vehicle to obtain the to-be-processed image. The shooting parameter of the to-be-processed image includes the focal length, the wide angle, the position, the rotation angle and/or other parameters that are used when the image capturing device photographs the vehicle. According to the principle of optical imaging, the relative position of a feature point to the image capturing device may be determined based on the position of the feature point in the to-be-processed image and the shooting parameter of the to-be-processed image. The end region feature and the side region feature in the to-be-processed image can comprehensively reflect a three-dimensional feature of the vehicle, which can be used to determine the relative position of the vehicle to the image capturing device.

As a possible implementation, the determining a relative position of the vehicle to the image capturing device, based on the end region feature, the side region feature and a shooting parameter of the to-be-processed image, may include: determining, one of the end region and the side region, that faces toward the image capturing device as a target region; and determining the relative position of the vehicle to the image capturing device, based on a region feature of the target region and the shooting parameter of the to-be-processed image.

Specifically, the target region that faces toward the image capturing device may be determined based on the size and/or shape of the end region and the side region. For example, a region with a relatively large size or a region in a rectangular shape may be determined as the target region that faces toward the image capturing device.

Referring to FIG. 4(e), the head region is larger than the side region, and then it may be determined that the head region faces toward the image capturing device. Therefore, the head region may be determined as the target region. Furthermore, the head region is in a rectangular shape while the side region is in a parallelogram region, and thus the head region may be determined as facing toward the image capturing device. Therefore, the head region may be determined as the target region.

The region feature of the target region may include a position of a vertex of the target region in the to-be-processed image, a position of a center point of the target region in the to-be-processed image, a position of a midpoint of an edge of the target region in the to-be-processed image, or a position of any other feature point of the target region in the to-be-processed image.

In an example of the vehicle shown in FIG. 4(e), the target region is the head region, and a relative position of the center point of the head region to the image capturing device may be determined based on the position of the center point of the head region in the to-be-processed image and a shooting parameter of the to-be-processed image.

As another possible implementation, the determining a relative position of the vehicle to the image capturing device, based on the end region feature, the side region feature and a shooting parameter of the to-be-processed image, may include: determining the relative position of the vehicle to the image capturing device based on a boundary between the end region and the side region, and the shooting parameter of the to-be-processed image.

Specifically, a midpoint of the boundary may be determined, and the relative position of the vehicle to the image capturing device may be determined based on the midpoint of the boundary and the shooting parameter of the to-be-processed image. This is because the boundary between the end region and the side region is often the closest to the image capturing device, which may lead to a relatively accurate relative position of the vehicle to the image capturing device.

Figure 5:
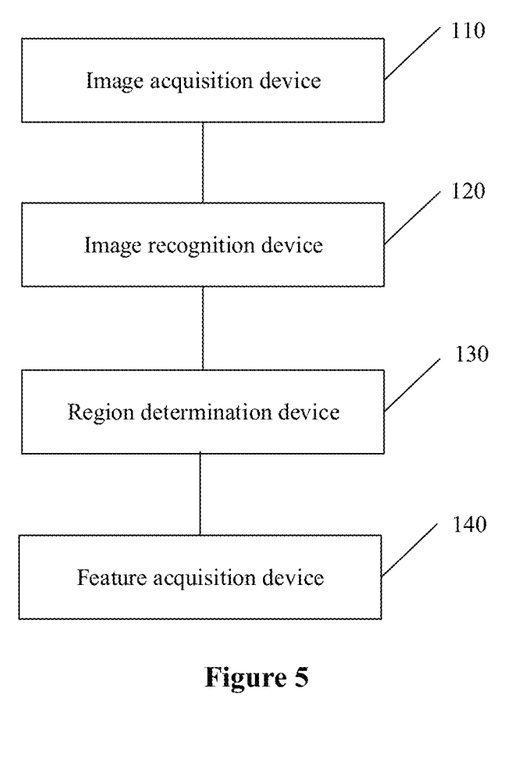
FIG. 5 is a structural block diagram of a device for acquiring a vehicle feature according to an embodiment of the present disclosure.

Based on the method for acquiring a vehicle feature, a device for acquiring a vehicle feature is provided according to an embodiment of the present disclosure. Reference is made to FIG. 5, which is a structural block diagram of a device for acquiring a vehicle feature according to an embodiment of the present disclosure. The device may include an image acquisition device 110, an image recognition device 120, a region determination device 130 and a feature acquisition device 140.

The image acquisition device 110 is configured to acquire a to-be-processed image including a vehicle.

The image recognition device 120 is configured to recognize a feature element of the vehicle from the to-be-processed image. The feature element includes a side element and an element of a vehicle end, and the vehicle end includes a head of the vehicle or a rear of the vehicle.

The region determination device 130 is configured to determine a side region of the vehicle and an end region of the vehicle, based on a position of the side element in the to-be-processed image and a position of the element of the vehicle end in the to-be-processed image.

The feature acquisition device 140 is configured to acquire a side region feature based on the side region, and acquire an end region feature based on the end region.

In an embodiment, the region determination device includes a vehicle region determination device, a boundary determination device and a region determination subdevice.

The vehicle region determination device is configured to determine, in the to-be-processed image, a vehicle region where the vehicle locates.

The boundary determination device is configured to determine a boundary between the side region and the end region, based on the position of the element that is of the vehicle end and is close to the side element in the to-be-processed image and the position of the side element that is close to the element of the vehicle end in the to-be-processed image.

The region determination subdevice is configured to determine, in the vehicle region, the side region and the end region, based on the boundary, the position of the side element in the to-be-processed image, and the position of the element of the vehicle end in the to-be-processed image.

In an embodiment, the device further includes a relative position determination device, configured to determine the relative position of the vehicle to an image capturing device, based on the end region feature, the side region feature and the shooting parameter of the to-be-processed image.

In an embodiment, the relative position determination device includes a target region determination device and a relative position determination subdevice.

The target region determination device is configured to determine one of the end region and the side region, that faces toward the image capturing device, as a target region. The image capturing device is a device that photographs the vehicle to obtain the to-be-processed image.

The relative position determination subdevice is configured to determine the relative position of the vehicle to the image capturing device, based on a region feature of the target region and the shooting parameter of the to-be-processed image.

In an embodiment, the relative position determination device is configured to determine the relative position of the vehicle to the image capturing device, based on a boundary between the end region and the side region, and the shooting parameter of the to-be-processed image.

In an embodiment, the side region feature includes a position of a vertex of the side region in the to-be-processed image, a position of a center point of the side region in the to-be-processed image, or a position of a midpoint of an edge of the side region in the to-be-processed image; and the end region feature includes a position of a vertex of the end region in the to-be-processed image, a position of a center point of the end region in the to-be-processed image, or a position of a midpoint of an edge of the end region in the to-be-processed image.

In an embodiment, the image recognition device includes a vehicle region recognition device, a vehicle image acquisition device and a feature element recognition device.

The vehicle region recognition device is configured to recognize the vehicle region where the vehicle locates from the to-be-processed image.

The vehicle image acquisition device is configured to clip the vehicle region from the to-be-processed image to generate a vehicle image.

The feature element recognition device is configured to recognize a feature element of the vehicle from the vehicle image.

In an embodiment, the element of the head of the vehicle includes one or more of a front light, a front window, a bumper and a front license plate, the element of the rear of the vehicle includes one or more of a rear light, a rear window, and a rear license plate, and the side element includes one or more of a wheel, a side window, a rearview mirror, and a door.

In the device for acquiring a vehicle feature provided according to the embodiment of the present disclosure, a to-be-processed image including a vehicle is acquired. A feature element of the vehicle is then recognized from the to-be-processed image, where the feature element may include a side element and an element of a vehicle end, and the vehicle end may be a head of the vehicle or a rear of the vehicle. Based on a position of the side element in the to-be-processed image and a position of the element of the vehicle end in the to-be-processed image, a side region of the vehicle and an end region of the vehicle may be determined. As a result, a side region feature may be acquired based on the side region, and an end region feature may be acquired based on the end region. Therefore, regions in the vehicle in the to-be-processed image are first obtained, and then region features are acquired from the obtained regions, which can obtain a more comprehensive vehicle feature, compared with the conventional technology of determining only a position of the vehicle in the to-be-processed image.

The expressions "first" and similar variant mentioned in the embodiments of the present disclosure are used only for distinguish different names, rather than indicating the first in a sequence. The same also applies to the expression "second".

As can be seen from the above embodiments, it can be clearly appreciated by those skilled in the art that, all or a part of steps in the methods according to the above embodiments may be implemented by means of software and general hardware platform. Based on such understanding, embodiments of the present disclosure may be embodied as a software product. The computer software product may be stored in a storage medium, such as a read-only memory (ROM)/RAM, a magnetic disc, or an optical disk, and the computer software product includes multiple instructions for enabling a computer device (which may be a personal computer, a server, or a network communication device such as a router) to perform the methods described in various embodiments or some parts of the embodiments of the present disclosure.

The embodiments of the present disclosure are described in a progressive manner, the same or similar parts among the embodiments can be referred to each other, and each embodiment places emphasis on the difference from other embodiments. Particularly, since embodiments of the methods and devices are substantially similar to the embodiments of the system, the embodiments of the methods and devices are described briefly. For relevant parts, reference may be made to the description of the system. The device and method embodiments described above are only illustrative. The devices described as separate components may be or may not be separated physically, and the components shown as devices may be or may not be physical devices, that is, the components may be located at the same position or may be distributed onto multiple network devices. Some or all devices thereof may be selected based on an actual requirement, to implement an objective of the solution in the embodiments. Those skilled in the art may understand and implement the present disclosure without creative work.

The invention claimed is:

1. A method for acquiring a vehicle feature, comprising:
acquiring a to-be-processed image comprising a vehicle;
recognizing a feature element of the vehicle from the to-be-processed image, wherein the feature element comprises a side element and an element of a vehicle end, and the vehicle end comprises a head of the vehicle or a rear of the vehicle, the side element comprises one or more of a wheel, a side window, a rearview mirror, and a door;
determining, in the to-be-processed image, a side region of the vehicle and an end region of the vehicle, based on a location where the side element is in the to-be-processed image and a location where the element of the vehicle end is in the to-be-processed image; and
acquiring a side region feature based on the side region, and an end region feature based on the end region, wherein the side region feature comprises a location where a vertex of the side region is in the to-be-processed image, a location where a center point of the side region is in the to-be-processed image, or a location where a midpoint of an edge of the side region is in the to-be-processed image; and
determining a relative position of the vehicle to an image capturing device, based on the end region feature, the side region feature and a shooting parameter of the to-be-processed image.

2. The method according to claim 1, wherein the determining, in the to-be-processed image, a side region of the vehicle and an end region of the vehicle, based on a location where the side element is in the to-be-processed image and a location where the element of the vehicle end is in the to-be-processed image, comprises:
determining, in the to-be-processed image, a vehicle region where the vehicle locates;
determining a boundary between the side region and the end region, based on the location of the element that is of the vehicle end and is close to the side element in the to-be-processed image and the location of the side element that is close to the element of the vehicle end in the to-be-processed image; and
determining, in the vehicle region, the side region and the end region, based on the boundary, the location of the side element in the to-be-processed image, and the location of the element of the vehicle end in the to-be-processed image.

3. The method according to claim 1, wherein the recognizing a feature element of the vehicle from the to-be-processed image comprises:
recognizing the vehicle region where the vehicle locates in the to-be-processed image;
clipping the vehicle region from the to-be-processed image to generate a vehicle image; and
recognizing the feature element of the vehicle from the vehicle image.

4. The method according to claim 1, wherein
the image capturing device is a device that photographs the vehicle to obtain the to-be-processed image.

5. The method according to claim 4, wherein the determining a relative position of the vehicle to an image capturing device, based on the end region feature, the side region feature and a shooting parameter of the to-be-processed image, comprises:
determining, one of the end region and the side region, that faces toward the image capturing device, as a target region; and
determining the relative position of the vehicle to the image capturing device, based on a region feature of the target region and the shooting parameter of the to-be-processed image.

6. The method according to claim 4, wherein the determining a relative position of the vehicle to an image capturing device, based on the end region feature, the side region feature and a shooting parameter of the to-be-processed image, comprises:
determining the relative position of the vehicle to the image capturing device, based on a boundary between the end region and the side region, and the shooting parameter of the to-be-processed image.

7. The method according to claim 1, wherein
the end region feature comprises a location where a vertex of the end region is in the to-be-processed image, a location where a center point of the end region is in the to-be-processed image, or a location where a midpoint of an edge of the end region is in the to-be-processed image.

8. The method according to claim 1, wherein
the element of the head of the vehicle comprises one or more of a front light, a front window, a bumper and a front license plate, and
the element of the rear of the vehicle comprises one or more of a rear light, a rear window, and a rear license plate.

9. A device for acquiring a vehicle feature, comprising:
an image acquisition unit configured to acquire a to-be-processed image comprising a vehicle;
an image recognition unit configured to recognize a feature element of the vehicle from the to-be-processed image, wherein the feature element comprises a side element and an element of a vehicle end, and the vehicle end comprises a head of the vehicle or a rear of the vehicle, the side element comprises one or more of a wheel, a side window, a rearview mirror, and a door;
a region determination unit configured to determine, in the to-be-processed image, a side region of the vehicle and an end region of the vehicle, based on a location where the side element is in the to-be-processed image and a location where the element of the vehicle end is in the to-be-processed image; and
a feature acquisition unit, configured to acquire a side region feature based on the side region, and acquire an end region feature based on the end region, wherein the side region feature comprises a location where a vertex of the side region is in the to-be-processed image, a location where a center point of the side region is in the to-be-processed image, or a location where a midpoint of an edge of the side region is in the to-be-processed image; and
a relative position determination unit, configured to determine a relative position of the vehicle to an image capturing device, based on the end region feature, the side region feature and a shooting parameter of the to-be-processed image.

10. The device according to claim 9, wherein the region determination unit comprises:
a vehicle region determination unit configured to determine, in the to-be-processed image, a vehicle region where the vehicle locates;
a boundary determination unit configured to determine a boundary between the side region and the end region, based on the location of the element that is of the vehicle end and is close to the side element in the to-be-processed image and the location of the side element that is close to the element of the vehicle end in the to-be-processed image; and a region determination subunit configured to determine, in the vehicle region, the side region and the end region, based on the boundary, the location where the side element is in the to-be-processed image, and the location where the element of the vehicle end is in the to-be-processed image.

11. The device according to claim 9, wherein the image capturing device is a device that photographs the vehicle to obtain the to-be-processed image.

12. The device according to claim 11, wherein the relative position determination unit comprises:

a target region determination unit configured to determine, one of the end region and the side region, that faces toward the image capturing device, as a target region; and a relative position determination subunit configured to determine the relative position of the vehicle to the image capturing device, based on a region feature of the target region and the shooting parameter of the to-be-processed image.

13. The device according to claim 11, wherein the relative position determination unit is configured to determine the relative position of the vehicle to the image capturing device, based on a boundary between the end region and the side region, and the shooting parameter of the to-be-processed image.

14. The device according to claim 9, wherein the end region feature comprises a location where a vertex of the end region is in the to-be-processed image, a location where a center point of the end region is in the to-be-processed image, or a location where a midpoint of an edge of the end region is in the to-be-processed image.

15. The device according to claim 9, wherein the image recognition unit comprises:

a vehicle region recognition unit configured to recognize the vehicle region where the vehicle locates in the to-be-processed image;

an vehicle image acquisition unit configured to clip the vehicle region from the to-be-processed image to generate a vehicle image; and a feature element recognition unit configured to recognize the feature element of the vehicle from the vehicle image.

16. The device according to claim 9, wherein the element of the head of the vehicle comprises one or more of a front light, a front window, a bumper and a front license plate, and the feature element of the rear of the vehicle comprises one or more of a rear light, a rear window, and a rear license plate.

* * * * *